No. 758,418. PATENTED APR. 26, 1904.
W. R. COCK.
TESTING MACHINE.
APPLICATION FILED SEPT. 26, 1903.
NO MODEL.

Witnesses
Inventor
William R. Cock.

No. 758,418.

Patented April 26, 1904.

UNITED STATES PATENT OFFICE.

WILLIAM R. COCK, OF PLAINFIELD, NEW JERSEY, ASSIGNOR OF ONE-HALF TO FREDERICK A. RIEHLE, OF PHILADELPHIA, PENNSYLVANIA.

TESTING-MACHINE.

SPECIFICATION forming part of Letters Patent No. 758,418, dated April 26, 1904.

Application filed September 26, 1903. Serial No. 174,727. (No model.)

*To all whom it may concern:*

Be it known that I, WILLIAM R. COCK, a citizen of the United States, residing at Plainfield, Union county, State of New Jersey, have invented a new and useful Improvement in Testing-Machines, of which the following is a specification.

My invention relates to testing-machines.

It comprises means for continuously changing the strain on the article to be tested by a gradual reduction of a counterpoising weight.

It also consists of means for instantly determining the amount of such reduction.

It further consists of novel details of construction, all as will be hereinafter fully set forth.

Figure 1:
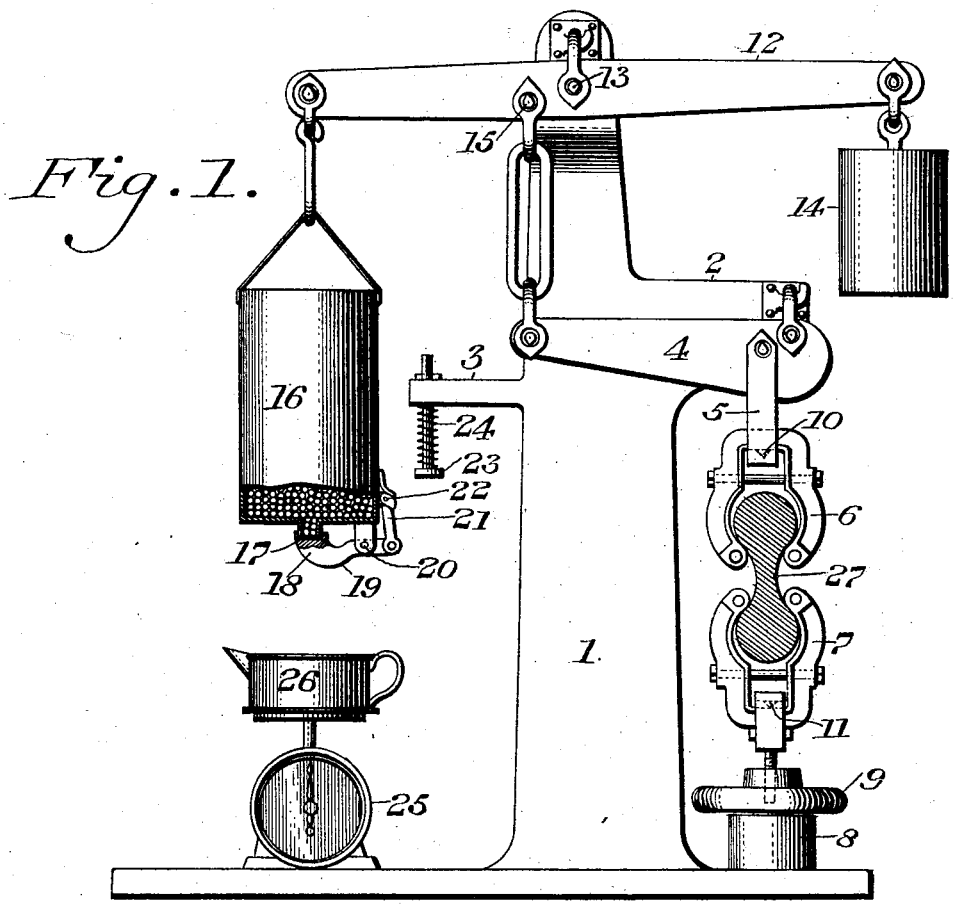
Figure 2:
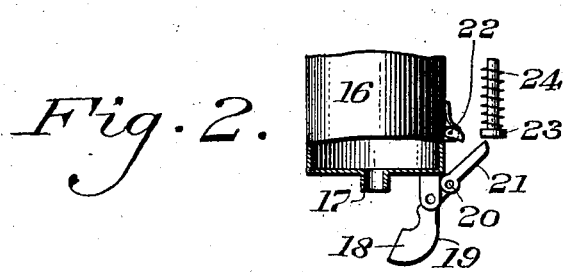

Figure 1 represents in elevation a cement-testing machine embodying my invention. Fig. 2 represents a portion of the machine in a different position.

Similar numerals of reference indicate corresponding parts in the figures.

Referring to the drawings, 1 designates a standard having lateral arms 2 and 3. Pivoted at the end of the arm 2 is a lever 4, from which depends a yoke 5, on which is hung the upper member 6 of a cement-clamp of well-known or desired construction. The lower member 7 of the clamp is supported on a block 8 on the base portion of the standard 1. The block 8 may have a hand-wheel working on a screw-bolt 9 for securing vertical adjustment, and the clamps may be hung in knife-edges 10 11 in the usual manner.

At the upper end of the standard 1 is hung a scale-beam 12, fulcrumed at 13 and having at one end a standard or constant weight 14. The long end of the lever 4 has link-and-yoke connections with a knife-edge pin 15 in the beam 12 near the fulcrum 13 on the side of the beam opposite the weight 14. At the end of the beam 12 opposite the weight 14 is hung a receptacle 16, adapted to contain a mass of shot or the like. At the bottom of the receptacle or vessel 16 is an orifice 17, closable by a valve or cup 18 at the end of a lever 19, hung in a pivot 20 at the lower edge of the vessel. At the other end of the cup-lever 19 is a pivoted dog 21, forming when extended a part of said lever and adapted to engage with a projection 22 in the side of the vessel.

Depending from the arm 3 of the standard 1 is a headed pin 23, which, as shown, is capable of vertical movement through the arm 3 and is restrained in its upward motion by a spring 24.

Beneath the vessel 16 is a scale 25, carrying a pan 26, adapted to receive the shot from the vessel 16.

The operation is as follows: A test-piece 27 of cement, is placed, as shown, in the clamps 6 and 7, the vessel 16 being previously filled with shot, so as to counterpoise the weight 14. The necessary tension on the test-piece is secured by the rotation of the hand-wheel on the screw 9. The dog 21 is then disengaged from the lug 22 and permitted to drop to an alined position, as shown in Fig. 2. The valve-cup 18 will then move away from the orifice 17, and the shot will drop from the vessel 16 into the scale-pan 26. As soon as the weight of the constant 14 sufficiently exceeds the gradually-reducing weight of the receptacle 16 the test-piece 27 will break. This permits the weight 14 to suddenly descend, when the dog 21 will contact with the end of the spring-actuated pin 23 and raise the cup 18 against the orifice 17, thereby cutting off the further flow of the shot therefrom. The index of the scale at once gives the weight of the shot, which is of course the gravitative effect of the weight 14. This being multiplied by the figure representing the relative lengths of the arms of the levers 4 and 2 will give the breaking strain of the cement in pounds or other units, or the calculation as to leverage having been made once for all the dial of the scale 25 may be made to give the result at a glance.

It will be understood that the lever 19 and dog 21 together form a catch-lever adapted to engage with and to be moved by the spring-actuated rod 23.

It is obvious that many alterations may be made in my device without departing from my invention. Thus, *e. g.*, the particular means for starting or stopping the dropping of the shot are non-essential.

It is evident that by the term "shot" I include any convenient small heavy particles, which need not even be of the same size or weight.

Having thus described my invention, what I claim as new, and desire to secure by Letters Patent, is—

1. In a testing-machine, a receptacle for containing shot having an aperture, a closure for said aperture, means for locking said closure and means on said machine supported independently of said receptacle for operating said closure.

2. In a testing-machine, a receptacle for containing shot having an aperture, a cup-lever adapted to close said aperture pivotally attached to said receptacle and a portion supported independently of said receptacle for engaging said lever and thereby closing said aperture.

3. In a testing-machine, a receptacle for containing shot having an aperture, a cup-lever adapted to close said aperture pivotally attached to said receptacle and resilient means supported independently of said receptacle for engaging said lever and closing said aperture.

4. In a testing-machine, a shot-receptacle having an aperture, a cup-lever pivotally attached to said receptacle and adapted to close said aperture, and means on said receptacle engageable with said cup-lever for maintaining it in operative relation with said aperture.

5. In a testing-machine, a shot-receptacle having an aperture, a cup-lever pivotally attached to said receptacle and adapted to close said aperture, a dog pivoted to and forming a part of said lever, and a projection on said receptacle adapted to engagement with said dog, whereby said cup-lever is maintained in operative relation with said aperture.

WILLIAM R. COCK.

Witnesses:
  VINCENT W. NASH,
  FRANK DAY.